United States Patent
Kandhasamy et al.

(10) Patent No.: US 12,158,838 B1
(45) Date of Patent: Dec. 3, 2024

(54) WEB OBJECT MAINTENANCE IN A SOFTWARE APPLICATION TESTING ENVIRONMENT

(71) Applicant: FMR LLC, Boston, MA (US)

(72) Inventors: Devanathan Kandhasamy, Puducherry (IN); Vinod Kumar Balaraman, Chennai (IN)

(73) Assignee: FMR LLC, Boston, MA (US)

( * ) Notice: Subject to any disclaimer, the term of this patent is extended or adjusted under 35 U.S.C. 154(b) by 0 days.

(21) Appl. No.: 18/543,280

(22) Filed: Dec. 18, 2023

(51) Int. Cl.
 *G06F 11/36* (2006.01)
 *G06F 8/65* (2018.01)
 *G06F 18/2415* (2023.01)

(52) U.S. Cl.
 CPC ............ *G06F 11/3688* (2013.01); *G06F 8/65* (2013.01); *G06F 18/2415* (2023.01)

(58) Field of Classification Search
 CPC ..... G06F 11/3688; G06F 18/2415; G06F 8/65
 See application file for complete search history.

(56) References Cited

U.S. PATENT DOCUMENTS

| | | | |
|---|---|---|---|
| 10,025,762 | B2 | 7/2018 | Punjabi |
| 10,678,678 | B1* | 6/2020 | Tsoukalas ............ G06F 11/3664 |
| 10,871,977 | B2 | 12/2020 | Hanke et al. |
| 11,928,050 | B2* | 3/2024 | Herren ................. G06F 11/3688 |
| 12,014,192 | B2* | 6/2024 | Riva ....................... G06F 3/0484 |
| 2009/0198714 | A1 | 8/2009 | Wake |
| 2011/0022943 | A1 | 1/2011 | Bou-Ghannam et al. |
| 2014/0053021 | A1* | 2/2014 | Schwartz ............ G06F 11/0793 714/15 |
| 2018/0349256 | A1* | 12/2018 | Fong ...................... G06F 40/284 |
| 2019/0362197 | A1* | 11/2019 | Jain ........................... G06N 3/04 |
| 2020/0073686 | A1* | 3/2020 | Hanke ..................... G06F 18/22 |

(Continued)

FOREIGN PATENT DOCUMENTS

CA     3108166 A1 *  8/2022

OTHER PUBLICATIONS

Anurag Dwarakanath et al., "Machines That Test Software Like Humans", Sep. 5, 2018, pp. 1-5 (Year: 2018).*

(Continued)

*Primary Examiner* — Matthew M Kim
*Assistant Examiner* — Indranil Chowdhury
(74) *Attorney, Agent, or Firm* — Cesari and McKenna, LLP

(57) ABSTRACT

Methods and systems are described for web object maintenance in a software application testing environment using reinforcement learning. A server detects failure of a test script caused by a web object of the software application. The server identifies the web object that caused the failure using code elements extracted from a webpage, including: determining, for each code element, actions to be performed against the code element, executing a deep neural network model to generate a reward value by applying each action to properties of the code element, selecting the code element having a maximum reward value, and classifying the code element upon comparing properties of the selected code element to properties of web objects in a repository. The server updates a web object in the repository to comprise the selected code element and the properties. The server resumes execution of the test script using the updated web object.

18 Claims, 5 Drawing Sheets

(56) References Cited

U.S. PATENT DOCUMENTS

| | | | |
|---|---|---|---|
| 2020/0097357 A1* | 3/2020 | Shwartz | G06F 8/70 |
| 2020/0341888 A1* | 10/2020 | Sridhar | G06F 11/3692 |
| 2020/0409829 A1* | 12/2020 | Bedi | G06F 11/3684 |
| 2021/0089436 A1* | 3/2021 | Gangina | G06F 11/3672 |
| 2021/0089437 A1* | 3/2021 | Reid | G06F 11/3684 |
| 2021/0216302 A1* | 7/2021 | Akhoury | G06F 40/166 |
| 2021/0334320 A1 | 10/2021 | Faust et al. | |
| 2021/0374040 A1* | 12/2021 | Kumar | G06F 11/368 |
| 2021/0390011 A1* | 12/2021 | Cser | G06F 11/3692 |
| 2021/0397546 A1* | 12/2021 | Cser | G06F 11/3684 |
| 2022/0171641 A1* | 6/2022 | Pichiliani | H04L 51/56 |
| 2022/0269384 A1 | 8/2022 | Sharma et al. | |
| 2022/0365872 A1 | 11/2022 | Finkelstein et al. | |
| 2022/0391312 A1* | 12/2022 | Sharma | G06F 11/3688 |
| 2023/0385181 A1* | 11/2023 | V | G06F 8/36 |

OTHER PUBLICATIONS

S. Jia et al., "DOM-Q-NET: Grounded RL on Structured Language," arXiv: 1902.07257v1 [cs.LG] Feb. 19, 2019, available at https://arxiv.org/pdf/1902.07257v1.pdf, 17 pages.

B. Yeoh and H. Wang, "Grown+Up: A 'Graph Representation of a Webpage' Network Utilizing Pre-training," arXiv:2208.02252v2 [cs.LG] Oct. 27, 2022, available at https://arxiv.org/pdf/2208.02252v2.pdf, 11 pages.

Y. Li and O. Riva, "Glider: A Reinforcement Learning Approach to Extract UI Scripts from Websites," SIGIR '21, Jul. 11-15, 2021, Virtual Event, Canada, ACM ISBN 978-1-4503-8037-Sep. 21, 2007, 11 pages.

J. Eskonen, "Deep Reinforcement Learning in Automated User Interface Testing," Thesis, Aalto University School of Science, Espoo, Finland, Apr. 4, 2019, 57 pages.

* cited by examiner

FIG. 3

```
[<input id="highlightNavBar" type="hidden" value="NONE"/>, <input autocomplete="off" name="DEVICE_PRINT" type="hidden" value="version=3.5.2.2&pm_fpua=mozilla/5.0 (Windows NT 10.0; Win64; x64) applewebkit/537.36 (KHTML, like Gecko) chrome/107.0.0.0 safari/537.36&pm_fpasw=internal-pdf-viewer&pm_fpan=Netscape&pm_fpol=true&pm_fpco=true&pm_fpsc=24|1280|720|688&pm_fpsw=&pm_fptz=-5.5&pm_fpln=lang=en-US|syslang=|userlang=&pm_fpjv=0&pm_fpce=&pm_fpfr=Mozilla&pm_fpol=true&pm_fpop=&pm_fpsp=&pm_fpsd=24&pm_fpsw=12.0&pm_fpsx=&pm_fpsy=&pm_fpelx=&pm_fpely=&pm_fpstbe=&pm_fpsvi=&pm_fpsvi=Windows&pm_brojv=107&pm_brchrome&pm_inpt=&pm_ext="/>, <input autocomplete="off" name="NUM_DAYS_PIN_EXP_WARNING" type="hidden" value="14"/>, <input aria-describedby="fs-user-info" aria-required="true" autocomplete="off" cla ss="fs-mask fs-nounmask" data-clear="true" data-maxlength="3" data-msg-invalid="A valid User ID and Password are required. Please modify your information and try again." data-msg-required="User ID is required." id="userid" name="userid" required="required" tabindex="3" type="text"/>, <input e ria-describedby="fs-error" aria-required="true" data-clear="true" data-msg-invalid="A valid User ID and Password are required. Please modify your information and try again." data-msg-required="Password is required." id="pin" maxlength="20" name="pin" required="required" tabindex="4" type="password"/>]
```

302
304
306
308
310
312 raw data length 5

300

| Object | Before Application Upgrade | After Application Upgrade | Automation Locator Property | Selenium Error | DQN | Rewards |
|---|---|---|---|---|---|---|
| UserName | `<input aria-describedby="fs-error" aria-required="true" data-clear="true" data-msg-invalid="A valid User ID and Password are required. Please modify your information and try again." data-msg-required="Username is required." id="username1" maxlength="20" name="Username1" required="required" tabindex="4" />` | `<input aria-describedby="fs-error" aria-required="true" data-clear="true" data-msg-invalid="A valid User ID and Password are required. Please modify your information and try again." data-msg-required="Username is required." id="username" maxlength="20" name="Username" required="required" tabindex="4" />` | name=Username1 | NoSuchElementException/ElementNotVisibleException | Generates list of Action of WebPage based on property ID - username ClassName - NA NAME - username XPATH - //[name='User name'] etc. | EXAMPLE ID = 1.0345(Max rewards) - Stored in Object DB Name = 0.2345 |
| Password | `<input aria-describedby="fs-error" aria-required="true" data-clear="true" data-msg-invalid="A valid User ID and Password are required. Please modify your information and try again." data-msg-required="Password is required." id="pin" maxlength="20" name="pin1" required="required" tabindex="4" type="password" />` | `<input aria-describedby="fs-error" aria-required="true" data-clear="true" data-msg-invalid="A valid User ID and Password are required. Please modify your information and try again." data-msg-required="Password is required." id="pin" maxlength="20" name="pin" required="required" tabindex="4" type="password" />` | name=pin1 | NoSuchElementException/ElementNotVisibleException | Generates list of Action of WebPage based on property ID - pin ClassName - NA NAME - pin XPATH - //[name='pin'] etc. | EXAMPLE ID = 1.0345(Max rewards) - Stored in Object DB Name = 0.2345 |

WEB OBJECT MAINTENANCE IN A SOFTWARE APPLICATION TESTING ENVIRONMENT

TECHNICAL FIELD

This application relates generally to methods and apparatuses, including computer program products, for web object maintenance in a software application testing environment using reinforcement learning.

BACKGROUND

Automated testing of web-based application software using automation scripts is crucial to understanding the functional impact of source code changes in a timely and efficient manner and identifying errors or other issues before the software is released to a production environment. Typically, the automation scripts are developed by testers and other quality assurance staff by capturing object properties (e.g., from web objects included in the web-based software) of the application under test and identifying HTML elements that are used to perform actions in the application software. The testers then generate automation scripts that refer to these object properties and HTML elements during execution of the script. However, many modern software development processes utilize a continuous integration/continuous deployment (CI/CD) model, where source code changes to the production application are occurring in tandem with testing and deployment of the application. In addition, production software is frequently upgraded (e.g., quarterly, monthly, etc.) to incorporate stability improvements and optimizations to not only the software itself, but to underlying tools and systems (e.g., Angular™ web development framework).

Due to the rapid pace of change that occurs to the application during a typical software development and deployment cycle, changes to the source code are not always in sync with corresponding changes to the test automation scripts. This can result in errors during automation testing-which slows down the software quality assurance process and also adds to the development pipeline in terms of bug fixes and script rewrites. In addition, the above issues with existing systems cause significant delays in production deployment efforts, increases the backlog of pending test executions, and increases cost of testing and deployment efforts.

SUMMARY

The methods and systems described herein beneficially overcome the deficiencies noted above to automatically identify changes to web objects and related properties in web-based software applications based upon errors detected during automation testing of the web-based applications. The techniques described herein advantageously provide for deep learning-based code analysis of an application under test to predict whether a given web object in the application is the likely cause of an error (e.g., due to a discrepancy between how the web object is defined or referenced in a test automation script and how the web object is defined or referenced in the application itself). Using the deep learning approach described in this document, such errors can be overcome during the execution of test scripts without requiring intervention by QA staff or developers. In addition, web object repositories that house the object data used to develop software and test scripts are automatically updated to contain the most recent versions of web objects used in the application. The dynamic nature of the methods and systems described herein beneficially enable the accommodation of last minute code deployment as testing activities can be completed quickly, increase automation suite stability, and reduce manual dependency of capturing objects after script failure due to object issues.

The invention, in one aspect, features a system for web object maintenance in a software application testing environment using reinforcement learning. The system includes a server computing device having a memory for storing computer-executable instructions and a processor that executes the computer-executable instructions. The server computing device detects failure of a test automation script executing in the software application testing environment, the failure caused by a web object of the software application. The server computing device identifies the web object that caused the failure using a plurality of code elements extracted from a webpage corresponding to the failure of the test automation script, including determining, for each code element, one or more actions to be performed against the code element, executing a deep neural network model to generate a reward value for each code element by applying each action to one or more properties of the code element, selecting the code element having a maximum reward value, and classifying the selected code element as the web object that caused the failure upon comparing one or more properties of the selected code element to one or more properties of web objects in an object repository. The server computing device updates a web object in the object repository to comprise the selected code element and the corresponding properties. The server computing device resumes execution of the test automation script using the updated web object.

The invention, in another aspect, features a computerized method of web object maintenance in a software application testing environment using reinforcement learning. A server computing device detects failure of a test automation script executing in the software application testing environment, the failure caused by a web object of the software application. The server computing device identifies the web object that caused the failure using a plurality of code elements extracted from a webpage corresponding to the failure of the test automation script, including determining, for each code element, one or more actions to be performed against the code element, executing a deep neural network model to generate a reward value for each code element by applying each action to one or more properties of the code element, selecting the code element having a maximum reward value, and classifying the selected code element as the web object that caused the failure upon comparing one or more properties of the selected code element to one or more properties of web objects in an object repository. The server computing device updates a web object in the object repository to comprise the selected code element and the corresponding properties. The server computing device resumes execution of the test automation script using the updated web object.

Any of the above aspects can include one or more of the following features. In some embodiments, extracting a plurality of code elements from the webpage comprises retrieving a document object model (DOM) structure from the webpage, selecting one or more code elements and associated properties from the DOM structure, and generating an array comprising the selected code elements and properties. In some embodiments, the code elements comprise HTML objects.

In some embodiments, executing a deep neural network model to generate a reward value for each code element comprises associating the code element and associated properties with a first state; executing, by the deep neural network model, an action of the one or more actions to change the first state to a second state; and generating, by the deep neural network model, a reward value for the code element in the second state based upon the associated properties, the reward value representing a prediction of whether the code element is the web object that caused the failure. In some embodiments, the deep neural network model comprises a Deep-Q Network (DQN) algorithm.

In some embodiments, classifying the selected code element as the web object that caused the failure comprises executing a trained classification model on the selected code element to classify the properties of the selected code element as belonging to a web object in the object repository. In some embodiments, updating a web object in the object repository to comprise the selected code element and the corresponding properties comprises changing one or more properties of the web object in the object repository to match corresponding properties of the selected code element. In some embodiments, the properties of the selected input code element comprise one or more of: an id value, a name value, an xpath value, a CSS value, a text value, or any combination thereof. In some embodiments, resuming execution of the test automation script using the updated web object comprises retrieving, by a computing device in the software application testing environment, the updated web object from the object repository; and executing, by the computing device in the software application testing environment, one or more steps in the test automation script using the updated web object.

Other aspects and advantages of the invention will become apparent from the following detailed description, taken in conjunction with the accompanying drawings, illustrating the principles of the invention by way of example only.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

FIG. 3 is a diagram of an exemplary array of code elements generated by web scraping module for processing by deep neural network testing agent module.

FIG. 4 is a diagram of an exemplary user interface screen providing a view of web object changes.

DETAILED DESCRIPTION

Figure 1:
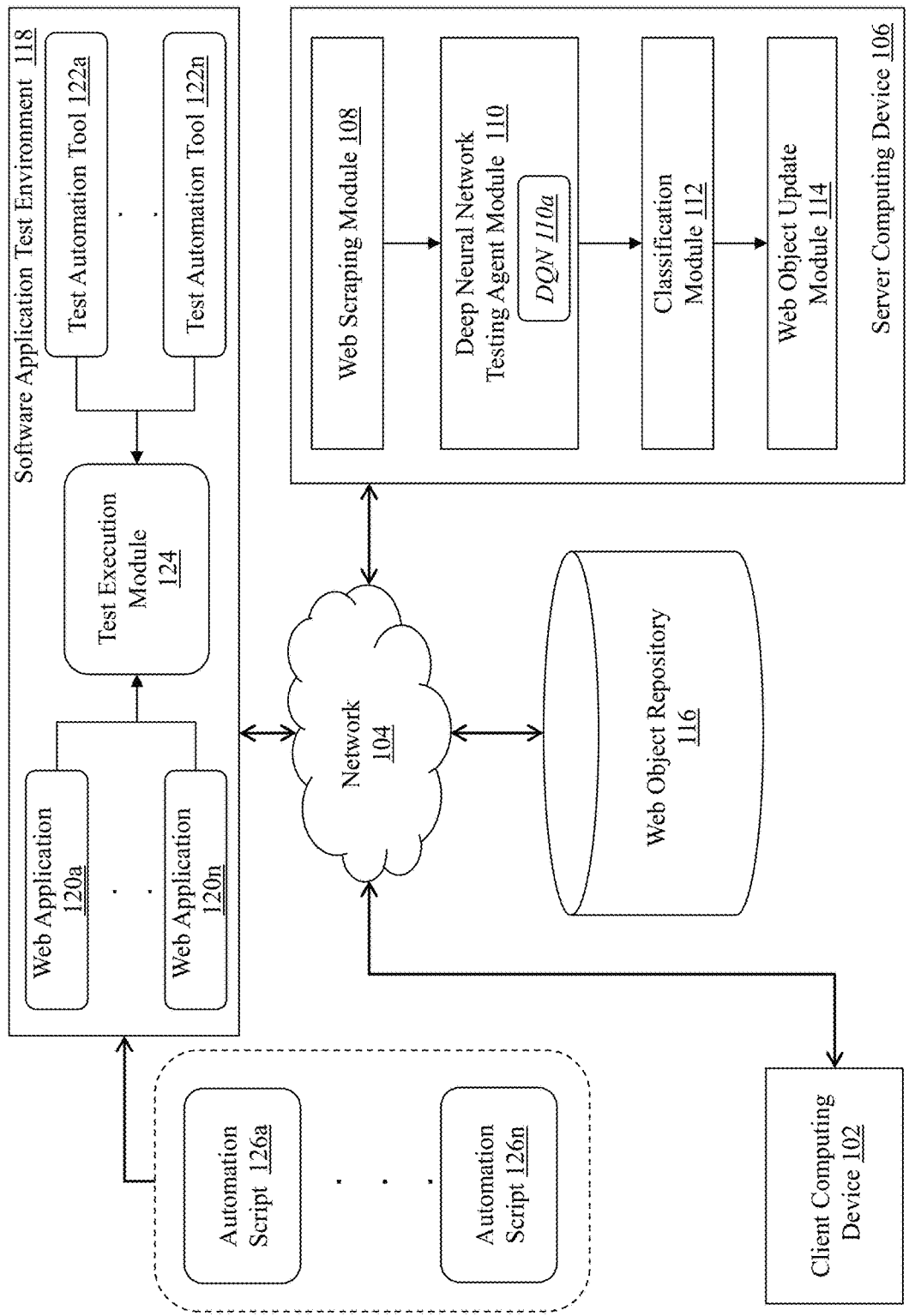
FIG. 1 is a block diagram of a system for web object maintenance in a software application testing environment using reinforcement learning.

FIG. 1 is a block diagram of a system for web object maintenance in a software application testing environment using reinforcement learning. The system 100 includes a client computing device 102, a communications network 104, a server computing device 106 comprising a web scraping module 108, a deep neural network testing agent module 110, a classification module 112, and a web object update module 114, a web object repository 116, and a software application test environment 118 including a plurality of web applications under test 120a-120n, a plurality of test automation tools 122a-122n, and a test execution module 124, and a plurality of software test automation scripts.

Client computing device 102 uses software and circuitry (e.g., one or more processors and memory modules) to execute applications and communicate with server computing device 106, web object repository 116, and/or software application test environment 118 via communications network 104 for the purpose of web object maintenance in a software application testing environment using reinforcement learning. Exemplary client computing devices 102 include but are not limited to desktop computers, laptop computers, tablets, mobile devices, smartphones, and internet appliances. It should be appreciated that other types of computing devices that are capable of connecting to the components of system of FIG. 1 can be used without departing from the scope of invention. Although FIG. 1 depicts a single client computing device 102, it should be appreciated that system 100 of FIG. 1 can include any number of client computing devices. And as mentioned above, in some embodiments client computing device 102 is coupled to a display (e.g., screen, monitor) for receiving data from web object repository 116, and/or software application test environment 118 and displaying data to a user of client computing device 102.

Communications network 104 enables the other components of system 100 to communicate with each other in order to perform functions relating to the process of web object maintenance in a software application testing environment using reinforcement learning as described herein. Network 104 may be a local network, such as a LAN, or a wide area network, such as the Internet and/or a cellular network. In some embodiments, network 104 is comprised of several discrete networks and/or sub-networks (e.g., cellular to Internet) that enable the components of the system of FIG. 1 to communicate with each other.

Server computing device 106 is a computing device (or in some embodiments, a set of computing devices) that comprises a combination of hardware, including one or more processors and one or more physical memory modules, and specialized software modules that execute on processor(s) of server computing device 106, to receive data from other components of system 100, transmit data to other components of system 100, and perform functions for web object maintenance in a software application testing environment using reinforcement learning as described herein. As mentioned above, server computing device 106 includes web scraping module 108, deep neural network testing agent module 110, classification module 112, and web object update module 114.

In some embodiments, modules 108, 110, 112, and 114 are specialized sets of computer software instructions programmed onto one or more dedicated processors in server computing device 106 and can include designated memory locations and/or registers for executing the specialized computer software instructions. Although modules 108, 110, 112, and 114 are shown in FIG. 1 as executing within the same server computing device 106, in some embodiments the functionality of modules 108, 110, 112, and 114 can be distributed among a plurality of server computing devices. As shown in FIG. 1, server computing device 106 enables modules 108, 110, 112, and 114 to communicate with each other in order to exchange data for the purpose of performing the described functions. It should be appreciated that any number of computing devices, arranged in a variety of architectures, resources, and configurations (e.g., cluster computing, virtual computing, cloud computing) can be used without departing from the scope of the invention. The exemplary functionality of modules 108, 110, 112, and 114 is described in detail below.

Web object repository 116 is a computing device (or in some embodiments, a set of computing devices) that is coupled to server computing device 106 via network 104 and is configured to receive, generate, and store specific data elements relating to the process of web object maintenance in a software application testing environment using reinforcement learning as described herein. In some embodiments, all or a portion of repository 116 can be integrated with server computing device 106 and/or software application test environment 118 or be located on a separate computing device or devices. For example, repository 116 can comprise one or more databases, file stores, artifact repositories, and other types of functions for storing web objects. Generally, web objects comprise discrete elements (e.g., text, graphics, user input features, scripts) that make up a webpage in a browser-based software application. Each web object can comprise one or more properties that define attributes or characteristics of the web object—for example, properties can relate to identification features, visual attributes, data formatting, and/or functions, among others. A property is an association between a name (or key) of the property and a value of the property. Web object repository 116 can be configured to store web object definitions and properties for the web objects used in one or more software applications under test in software application test environment 118. An exemplary web object repository 116 can be configured using the MongoDB® Atlas database platform (available from MongoDB, Inc. of New York, NY).

Software application test environment 118 is a computing platform comprising one or more computing devices that provide test automation software tools 122a-122n (e.g., Sahi™, Selenium™) for the execution of software test automation scripts 126a-126n (e.g., code files) that automatically execute features and functions of web applications 120a-120n that are being tested in environment 118. Test execution module 124 is configured to retrieve one or more software test automation scripts 126a-126n and select a web application 120a-120n against which the test automation scripts are executed by one or more of the test automation tools 122a-122n. An exemplary software application under test can be a web-based application that is accessed via a browser (e.g., Chrome™, Safari™, or other similar web browsers), although other types of software applications under test can be contemplated within the scope of invention. In some embodiments, software application test environment 118 is accessible by software installed at the client computing device 102 to enable client computing device 102 to connect to test execution module 124 via an HTTP session in a browser, provide commands for the execution of particular test scripts, and receive application data and test results in response to the commands. Test automation scripts 126a-126n comprise code files written in any of a number of different programming languages (e.g., Java, Python) that are run by test automation tools 122a-122n to automatically carry out functionality in the application under test.

In one embodiment, a user at client computing device 102 issues a command to test execution module 124 of software application test environment 118 for the execution of one or more automation test scripts 126a-126n against, e.g., one or more web applications being tested 120a-120n. Test execution module 124 then initializes one or more test automation tools 122a-122n using, e.g., defined configuration parameters based upon the application(s) being tested and executes the test scripts to activate functionality of the web applications under test and capture corresponding outcomes and resulting files from execution of the test scripts (e.g., logs, image screenshots of an application user interface (UI), message notifications, error messages, etc.). In some embodiments, software application test environment 118 can transmit files, messages, or other notifications that result from the test execution to server computing device 106 for web object maintenance as described herein.

Figure 2:
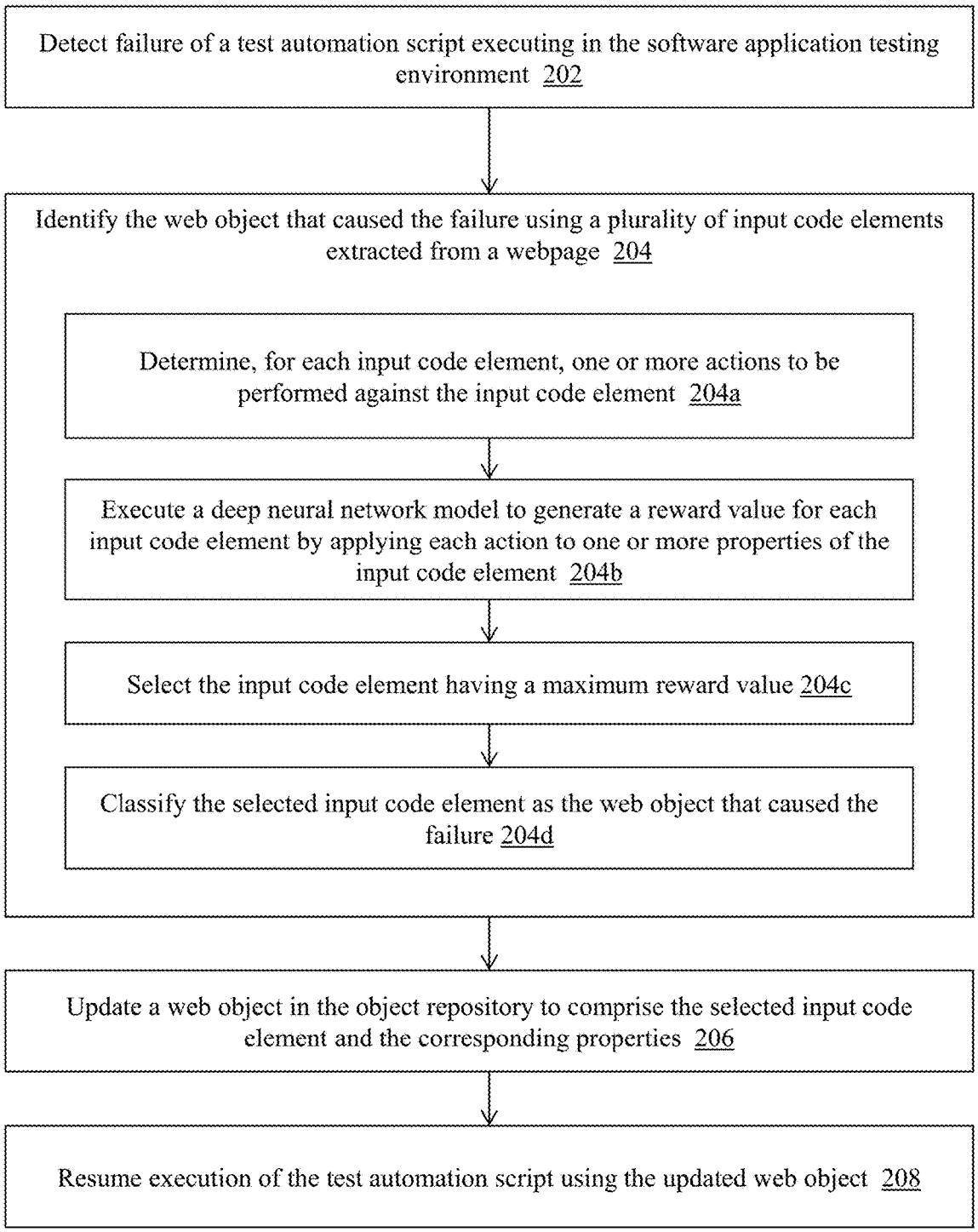
FIG. 2 is a flow diagram of a computerized method of web object maintenance in a software application testing environment using reinforcement learning.

FIG. 2 is a flow diagram of a computerized method 200 of web object maintenance in a software application testing environment using reinforcement learning, using system 100 of FIG. 1. As explained above, to initiate execution of one or more automation test scripts, client computing device 102 can issue one or more commands to test execution module 124 of software application test environment 118. Based upon the commands, test execution module 124 selects one or more web applications 120a-120n to be tested using one or more test scripts 126a-126n and one or more test automation tools 122a-122n. Test execution module 124 initializes the test automation tools to execute the test scripts against the web applications captures data associated with the test execution.

As described above, an exemplary web application 120a-120n to be tested is a browser-based application comprised of one or more webpages. The structure and content of each webpage (including the web objects that make up the webpage and the properties of each web object) are included in a document object model (DOM) for the webpage. Generally, the DOM defines the logical structure of the webpage and provides a way for the webpage content and structure to be accessed and changed. Typically, the DOM represents the structure and content of the webpage as a collection of nodes that each represent a web object and/or a property of a web object, with nodes being connected in order to define the relationships between the web objects/properties.

In some embodiments, test execution module 124 is configured to capture error messages and/or other indicia of a failure of the test automation script during execution against one or more web applications. An automation test script may encounter an error when executing a particular function in the script, resulting from a problem with the definition or configuration of one or more web objects in the web application. As one example, a particular test script may be created to interact with a web object having certain properties. However, the web application under test may comprise a different version of the web object with properties that do not align with the configuration and expectations of the test script. As a result, when encountering the older version of the web object, the test script may attempt to execute a particular test step (e.g., interaction with or manipulation of the web object) but due to the differing properties of the web object, the script may fail and generate an error message.

Module 124 transmits an indication of test script failure to server computing device 106. In some embodiments, the indication of test script failure comprises a message containing relevant data associated with the failed test script-such as script name, web application name, automation tool name, automation tool driver version, test session details, type of error, among others. In some embodiments, test execution module 124 is configured to analyze each error message generated during execution of the test script and filter the error messages to capture a subset of error messages that are specifically associated with web object issues. For example, if a script error is caused by a condition that is unrelated to a web object in the application under test—such as a misconfiguration of the test environment 118, connectivity problems, hardware failures, etc.—test execution module 124 can determine that the indication of script failure should not be transmitted to server computing device 106.

Upon receiving the indication of test script failure, web scraping module 108 of server computing device 106 parses the indication to detect (step 202) failure of the test automation script executing in the software application test environment 118. Web scraping module 108 extracts information from the webpage at which the script failure occurred. In some embodiments, web scraping module 108 retrieves the DOM for the webpage and scrapes the DOM to collect web objects—in one example, module 108 can capture web objects that are defined with HTML tags (also called code elements). In one example, the code element can be defined with an <input> HTML tag, which corresponds to an interactive field or element in the webpage. Other types of HTML tags in the DOM can be scraped and analyzed. Module 108 can store the scraped HTML tags and related object properties as an array for processing by deep neural network testing agent module 110.

FIG. 3 is a diagram of an exemplary array 300 of code elements generated by web scraping module 108 for processing by deep neural network testing agent module 110. As shown in FIG. 3, array 300 comprises a plurality of code elements 302, 304, 306, 308, and 310 (in this example, each identified by the <input> tag) and each code element includes properties that define certain attributes or characteristics of the corresponding input code element. For example, code element 308 includes properties such as: id="userid"; maxlength="16'; and name="userid," among others. Array 300 also includes a count 312 of the elements in the array—in this example, the count is five.

Deep neural network testing agent module 110 receives the array of code elements from web scraping module 108 and identifies (step 204) the web object that caused the failure using the code elements. Testing agent module 110 includes a deep neural network model (e.g., Deep-Q Network (DQN) 110a) that is configured to analyze each code element to define a "state" of the application under test. Additional detail about the implementation of DQN to perform deep reinforcement learning on the application under test is described in S. Jia et al., "DOM-Q-NET: Grounded RL on Structured Language," arXiv: 1902.07257v1 [cs.LG] 19 Feb. 2019, which is incorporated herein by reference.

Testing agent module 110 determines (step 204a) one or more actions to be performed against the code element and executes the one or more actions against the application under test in the defined state. In some embodiments, the one or more actions comprise interactive actions such as clicking buttons or checkboxes, choosing a text box to fill in with input, etc. As an example, testing agent module 110 can instantiate execution of the application under test using one or more test automation tools from the test environment 118. In some embodiments, testing agent module 110 can use information received from test execution module 124 in order to configure a separate test execution process that models the test execution prior to the point of failure and/or at the point of failure. Testing agent module 110 can analyze a given code element in the first state. For example, the code element can be an input text box web object in a webpage of the application under test and the first state can be when the input text box is empty. Testing agent module 110 executes an action to fill in the text box, e.g., by calling a function in the test script to automatically insert a text string into the input text box. In some embodiments, the execution of one or more actions result in a change of the application state from the first state to a second state. In the case where the script is expecting an input text box element with certain properties but the application under test contains an input text box element with different properties, the second state can be a failure of the application (i.e., an error state). DQN 110a can receive the array with code elements associated with the error state as input and generate a reward value for each code element based upon the properties of the code element—where the reward value represents a prediction of whether the code element is the web object that caused the failure.

In some embodiments, DQN 110a receives the input array and encodes each code element in the input array into a multidimensional vector that represents the element and its properties. DQN 110a then executes (step 204b) on each multidimensional vector to generate the reward value by applying each action to one or more properties of the code element. In some embodiments, the one or more properties of the code element include an id value, a name value, an xpath value, a CSS value, a text value, or any combination thereof. For example, DQN 110a can analyze each of these properties in the context of the current state of the application under test to allocate a reward value (or prediction) to the code element. Typically, the reward value is the highest for with the code element that is likely to have caused the failure. In this way, DQN 110a leverages deep reinforcement learning principles to train and re-train its algorithm to maximize a reward value, even when training data is limited (e.g., due to frequent changes in the underlying web application configurations).

FIG. 4 is a diagram depicting exemplary DQN actions and associated reward values based upon a change in a code element. As shown in FIG. 4, an object (see column 402) has had a change to one of its properties during an application upgrade—column 404 shows the object properties prior to the upgrade and column 406 shows the object properties after the upgrade. For example, the value of the id element for the UserName object changed from 'Username1' to 'Username.' The test automation suite (e.g., module 124) is expecting the UserName object's id property to have a value of 'Username1' (see column 408). As a result, module 124 issues an error (see column 410) when executing a test involving the object. Upon receiving the input array based upon testing failure information, DQN 110a applies an action (see column 412) which generates a corresponding reward value (see column 414).

The following code provides an exemplary framework for defining and implementing DQN 110a in Python:

```
import torch
import torch.nn as nn
import torch.optim as optim
import numpy as np
import random
from collections import deque
#Define the Deep Q-Network
class DQN(nn.Module):
    def_init_(self, input_size, output_size):
        super(DQN, self)._init_( )
        self.fc1=nn.Linear(input_size, 128)
        self.relu=nn.ReLU( )
        self.fc2=nn.Linear(128, output_size)
```

```
    def forward(self, x):
    x=self.fc1(x)
    x=self.relu(x)
    x=self.fc2(x)
    return x
#Initialize the replay buffer
class ReplayBuffer:
    def_init_(self, capacity):
    self.buffer=deque(maxlen=capacity)
    def push(self, state, action, reward, next_state, done):
    experience=(state, action, np.array([reward]), next_state, done)
    self.buffer.append(experience)
    def sample(self, batch_size):
    state, action, reward, next_state, done=zip(*random.sample(self.buffer, batch_size))
return np.concatenate(state), action, reward, np.concatenate(next_state), done
def_len_(self):
    return len(self.buffer)
#Initialize the DQN agent
class DQNAgent:
    def_init_(self, state_size, action_size, capacity):
        self.device=torch.device("cuda" if torch.cuda.is_available( ) else "cpu")
        self.state_size=state_size
        self.action_size=action_size
        self.capacity=capacity
        self.batch_size=32
        self.gamma=0.99
        self.eps_start=1.0
        self.eps_end=0.01
        self.eps_decay=0.001
        self.policy_net=DQN(state_size, action_size).to(self.device)
        self.target_net=DQN(state_size, action_size).to(self.device)
        self.target_net.load_state_dict(self.policy_net.state_dict( ))
        self.target_net.eval( )
        self.optimizer=optim.Adam(self.policy_net.parameters( ))
        self.loss=nn.MSELoss( )
        self.memory=ReplayBuffer(capacity)
    def select_action(self, state, eps):
        if random.random( )<eps:
            return random.randrange(self.action_size)
        else:
            with torch.no_grad( )
                state=torch.FloatTensor(state).unsqueeze(0).to(self.device)
                q_values=self.policy_net(state)
                return q_values.argmax(1).item( )
    def update_target(self):
        self.target_net.load_state_dict(self.policy_net.state_dict( ))
#Train the DQN agent
    def train(self):
        if len(self.memory)<self.batch_size:
            return
        state, action, reward, next_state, done=self.memory.sample(self.batch_size)
        state=torch.FloatTensor(state).to(self.device)
        next_state=torch.FloatTensor(next_state).to(self.device)
        action=torch.LongTensor(action).to(self.device)
        reward=torch.FloatTensor(reward).to(self.device)
        done=torch.FloatTensor(done).to(self.device)
        q_values=self.policy_net(state).gather(1, action.unsqueeze(1)).squeeze(1)
        next_q_values=self.target_net(next_state).max(1)[0]
        expected_q_values
```

Once DQN 110a has generated reward values for the code elements, testing agent module 110 selects (step 204c) the code element that is assigned the maximum reward value-indicating that the code element is predicted by DQN 110a to be most likely associated with causing the failure of the test automation script. Testing agent module 110 captures the code element and the associated properties for analysis and classification by classification module 112.

Classification module 112 classifies (step 204d) the selected code element as the web object that caused the failure of the test automation script upon comparing one or more properties of the selected code element to one or more properties of web objects as stored in web object repository 116. In some embodiments, classification module 112 includes a machine learning classification model that is configured to receive as input a vectorized representation of the selected code element and associated properties and execute a classification algorithm that compares the vector representation of the code element to vector representations of existing web objects stored in repository 116. The comparison produces a classification value identifying a web object with properties that most closely matches the code element. In some embodiments, the classification model includes any of a number of different algorithms including, but not limited to, logistic regression, k-nearest neighbor, decision trees, support vector machine, and/or Bayesian algorithms. In some embodiments, classification module 112 generates a binary classification value (e.g., 0 when the code element does not match a web object and 1 when the code element does match a web object). In some embodiments, classification module 112 generates a similarity measure between the code element and one or more web objects, then selects the web object that is associated with the highest similarity measure.

After classifying the selected code element as matching one of the web objects in the repository 116, web object update module 114 updates (step 206) the web object in repository 116 to comprise the selected code element (i.e., the code element extracted from the webpage under test) and associated properties. In some embodiments, update module 114 replaces the web object properties as stored in repository 116 with the properties of the code element. For example, the 'id' property value for the selected code element is "id" and the 'id' property value for the web object in repository 116 is "pin." Update module 114 can overwrite the existing 'id' property value in repository 116 with the new value of "pin." At this point, web object repository 116 is now updated to match the web object values as implemented in the web application under test.

Server computing device 106 transmits a notification to test execution module 124 of software application test environment 118 that the web object repository 116 has been updated. Test execution module 124 resumes (step 208) execution of the test automation script that had failed using the updated data in web object repository 116. In some embodiments, test execution module 124 retrieves the updated web object from repository 116 and replaces one or more data elements in the test automation script with the corresponding data elements from the repository 116. For example, the test automation script may have contained an outdated definition for or reference to a particular web object. Test execution module 124 replaces the outdated definition/reference with the updated web object data retrieved from repository 116 and continues execution of the test script with the updated data.

Figure 5:
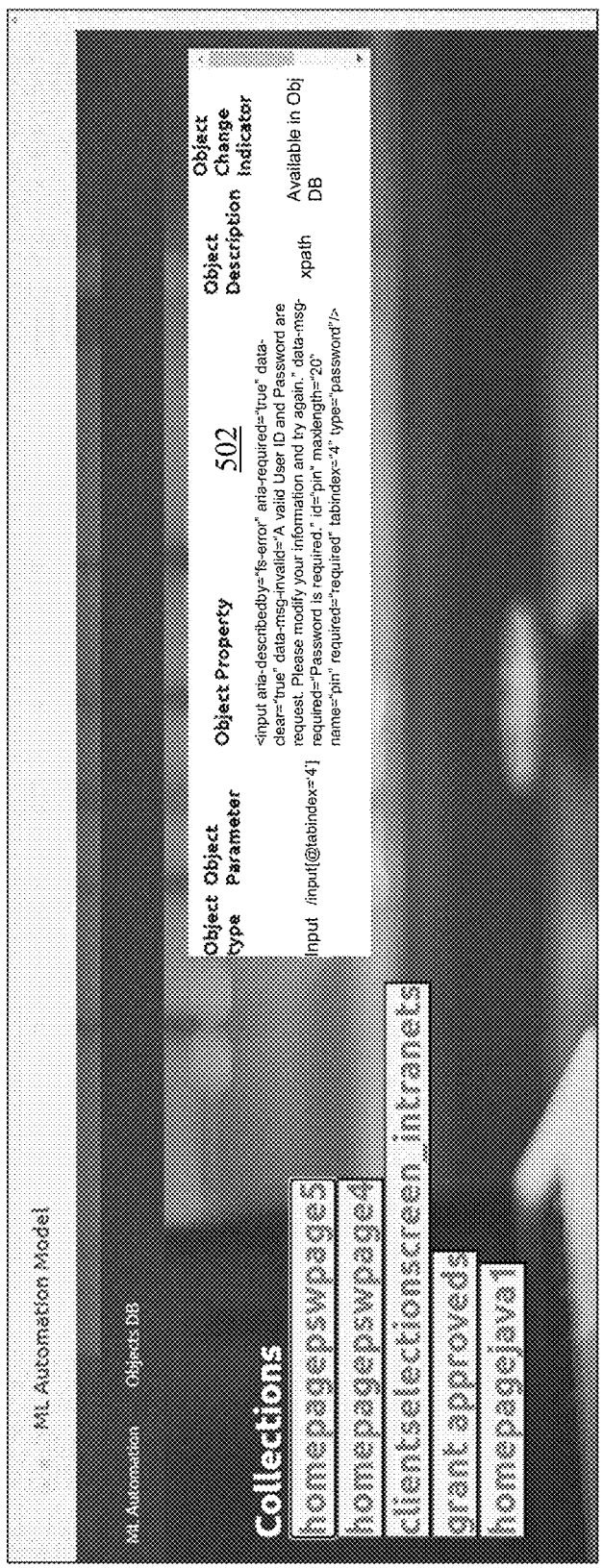
FIG. 5 is a diagram of an exemplary user interface screen providing a view of web object changes.

Users such as application developers and quality assurance staff can use client computing device 102 to view changes to web objects that occur in web object repository 116 as a result of the deep neural network processing described herein. FIG. 5 is a diagram of an exemplary user interface screen 500 providing a view of web object changes. In some embodiments, server computing device 106 and/or software application test environment 118 can provide a user interface function to allow client computing device 102 to connect to web object repository 116 and view web objects and their related properties as stored therein. As shown in FIG. 5, user interface 500 includes object view 502 which comprises detailed information about a web object-including object type ('input'), object parameter, object properties, object description, and object change indicator. This user interface enables developers and other users to quickly view relevant web object information during creation of subsequent automation scripts to ensure that the most current version of web objects and their parameters are being implemented in the scripts.

Method steps can be performed by one or more special-purpose processors executing a computer program to perform functions of the invention by operating on input data and/or generating output data. Method steps can also be performed by, and an apparatus can be implemented as, special-purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit), or the like. Subroutines can refer to portions of the stored computer program and/or the processor, and/or the special circuitry that implement one or more functions.

Processors suitable for the execution of a computer program include, by way of example, special-purpose microprocessors. Generally, a processor receives instructions and data from a read-only memory or a random-access memory or both. The essential elements of a computer are a specialized processor for executing instructions and one or more specifically allocated memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage mediums suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above described techniques can be implemented on a computing device in communication with a display device, e.g., a CRT (cathode ray tube), plasma, or LCD (liquid crystal display) monitor, a mobile device display or screen, a holographic device and/or projector, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above-described techniques can be implemented in a distributed computing system that includes a back-end component. The back-end component can, for example, be a data server, a middleware component, and/or an application server. The above-described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above-described techniques can be implemented in a distributed computing system that includes any combination of such back-end, middleware, or front-end components.

The components of the computing system can be interconnected by transmission medium, which can include any form or medium of digital or analog data communication (e.g., a communication network). Transmission medium can include one or more packet-based networks and/or one or more circuit-based networks in any configuration. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), Bluetooth, near field communications (NFC) network, Wi-Fi, WiMAX, general packet radio service (GPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), and/or other circuit-based networks.

Information transfer over transmission medium can be based on one or more communication protocols. Communication protocols can include, for example, Ethernet protocol, Internet Protocol (IP), Voice over IP (VOIP), a Peer-to-Peer (P2P) protocol, Hypertext Transfer Protocol (HTTP), Session Initiation Protocol (SIP), H.323, Media Gateway Control Protocol (MGCP), Signaling System #7 (SS7), a Global System for Mobile Communications (GSM) protocol, a Push-to-Talk (PTT) protocol, a PTT over Cellular (POC) protocol, Universal Mobile Telecommunications System (UMTS), 3GPP Long Term Evolution (LTE) and/or other communication protocols.

Devices of the computing system can include, for example, a computer, a computer with a browser device, a telephone, an IP phone, a mobile device (e.g., cellular phone, personal digital assistant (PDA) device, smart phone, tablet, laptop computer, electronic mail device), and/or other communication devices. The browser device includes, for example, a computer (e.g., desktop computer and/or laptop computer) with a World Wide Web browser (e.g., Chrome™ from Google, Inc., Microsoft® Internet Explorer® available from Microsoft Corporation, and/or Mozilla® Firefox available from Mozilla Corporation). Mobile computing device include, for example, a Blackberry® from Research in Motion, an iPhone® from Apple Corporation, and/or an Android™-based device. IP phones include, for example, a Cisco® Unified IP Phone 7985G and/or a Cisco® Unified Wireless Phone 7920 available from Cisco Systems, Inc.

Comprise, include, and/or plural forms of each are open ended and include the listed parts and can include additional parts that are not listed. And/or is open ended and includes one or more of the listed parts and combinations of the listed parts.

One skilled in the art will realize the subject matter may be embodied in other specific forms without departing from the spirit or essential characteristics thereof. The foregoing embodiments are therefore to be considered in all respects illustrative rather than limiting the subject matter described herein.

What is claimed is:

1. A system for web object maintenance in a software application testing environment using reinforcement learning, the system comprising a server computing device having a memory for storing computer-executable instructions and a processor that executes the computer-executable instructions to:
   detect failure of a test automation script executing in the software application testing environment, the failure caused by a first web object of a software application;
   identify the first web object using a plurality of code elements extracted from a webpage corresponding to the failure of the test automation script, comprising:
      determining, for each code element, one or more actions to be performed against the code element,
      executing a deep neural network model to generate a reward value for each code element by applying each action to one or more properties of the code element,
      selecting the code element having a maximum reward value, and
      classifying the selected code element as the first web object upon comparing one or more properties of the selected code element to one or more properties of web objects in an object repository;
   update a second web object in the object repository to comprise the selected code element and the one or more properties of the selected code element; and
   resume execution of the test automation script using the updated second web object.

2. The system of claim 1, wherein extracting the plurality of code elements from the webpage comprises retrieving a document object model (DOM) structure from the webpage, selecting one or more code elements and associated properties from the DOM structure, and generating an array comprising the selected code elements and associated properties as the plurality of code elements extracted from the webpage.

3. The system of claim 2, wherein the plurality of code elements extracted from the webpage comprise HTML objects.

4. The system of claim 1, wherein executing the deep neural network model to generate the reward value for each code element comprises:
   associating the code element and associated properties with a first state;
   executing, by the deep neural network model, an action of the one or more actions to change the first state to a second state; and
   generating, by the deep neural network model, the reward value for the code element in the second state based upon the associated properties, the reward value representing a prediction of whether the code element is the first web object.

5. The system of claim 4, wherein the deep neural network model comprises a Deep-Q Network (DQN) algorithm.

6. The system of claim 1, wherein classifying the selected code element as the first web object comprises executing a trained classification model on the selected code element to classify the properties of the selected code element as belonging to the second web object in the object repository.

7. The system of claim 1, wherein updating the second web object in the object repository to comprise the selected code element and the one or more properties of the selected code element comprises changing one or more properties of the second web object in the object repository to match corresponding properties of the selected code element.

8. The system of claim 7, wherein the properties of the selected code element comprise one or more of: an id value, a name value, an xpath value, a CSS value, a text value, or any combination thereof.

9. The system of claim 1, wherein resuming execution of the test automation script using the updated second web object comprises:
   retrieving, by a computing device in the software application testing environment, the updated second web object from the object repository; and
   executing, by the computing device in the software application testing environment, one or more steps in the test automation script using the updated second web object.

10. A computerized method of web object maintenance in a software application testing environment using reinforcement learning, the method comprising:
   detecting, by a server computing device, failure of a test automation script executing in the software application testing environment, the failure caused by a first web object of a software application;
   identifying, by the server computing device, the first web object using a plurality of code elements extracted from a webpage corresponding to the failure of the test automation script, comprising:
      determining, for each code element, one or more actions to be performed against the code element,
      executing a deep neural network model to generate a reward value for each code element by applying each action to one or more properties of the code element,
      selecting the code element having a maximum reward value, and
      classifying the selected code element as the first web object upon comparing one or more properties of the selected code element to one or more properties of web objects in an object repository;
   updating, by the server computing device, a second web object in the object repository to comprise the selected code element and the one or more properties of the selected code element; and
   resuming, by the server computing device, execution of the test automation script using the updated second web object.

11. The method of claim 10, wherein extracting the plurality of code elements from the webpage comprises retrieving a document object model (DOM) structure from the webpage, selecting one or more code elements and associated properties from the DOM structure, and generating an array comprising the selected code elements and associated properties as the plurality of code elements extracted from the webpage.

12. The method of claim 11, wherein the plurality of code elements extracted from the webpage comprise HTML objects.

13. The method of claim 10, wherein executing the deep neural network model to generate the reward value for each code element comprises:
- associating the code element and associated properties with a first state;
- executing, by the deep neural network model, an action of the one or more actions to change the first state to a second state;
- generating, by the deep neural network model, the reward value for the code element in the second state based upon the associated properties, the reward value representing a prediction of whether the code element is the first web object.

14. The method of claim 13, wherein the deep neural network model comprises a Deep-Q Network (DQN) algorithm.

15. The method of claim 10, wherein classifying the selected code element as the first web object comprises executing a trained classification model on the selected code element to classify the properties of the selected code element as belonging to the second web object in the object repository.

16. The method of claim 10, wherein updating the second web object in the object repository to comprise the selected code element and the one or more properties of the selected code element comprises changing one or more properties of the second web object in the object repository to match corresponding properties of the selected code element.

17. The method of claim 16, wherein the properties of the selected code element comprise one or more of: an id value, a name value, an xpath value, a CSS value, a text value, or any combination thereof.

18. The method of claim 10, wherein resuming execution of the test automation script using the updated second web object comprises:
- retrieving, by a computing device in the software application testing environment, the updated second web object from the object repository; and
- executing, by the computing device in the software application testing environment, one or more steps in the test automation script using the updated second web object.

* * * * *

UNITED STATES PATENT AND TRADEMARK OFFICE
CERTIFICATE OF CORRECTION

| | | |
|---|---|---|
| PATENT NO. | : 12,158,838 B1 | Page 1 of 1 |
| APPLICATION NO. | : 18/543280 | |
| DATED | : December 3, 2024 | |
| INVENTOR(S) | : Devanathan Kandhasamy et al. | |

It is certified that error appears in the above-identified patent and that said Letters Patent is hereby corrected as shown below:

In the Specification

Column 9, Line 21 reads:
"*# Initialize the DON agent*"
Should read:
--*# Initialize the DQN agent*--

Column 9, Line 57 reads:
"*# Train the DON agent*"
Should read:
--*# Train the DQN agent*--

Signed and Sealed this
Eighteenth Day of March, 2025

Coke Morgan Stewart
*Acting Director of the United States Patent and Trademark Office*